W. H. JORDAN.
VEHICLE DOOR.
APPLICATION FILED SEPT. 8, 1910.

999,370.

Patented Aug. 1, 1911.
2 SHEETS—SHEET 1.

WITNESSES:

INVENTOR.
William H. Jordan
BY
ATTORNEY.

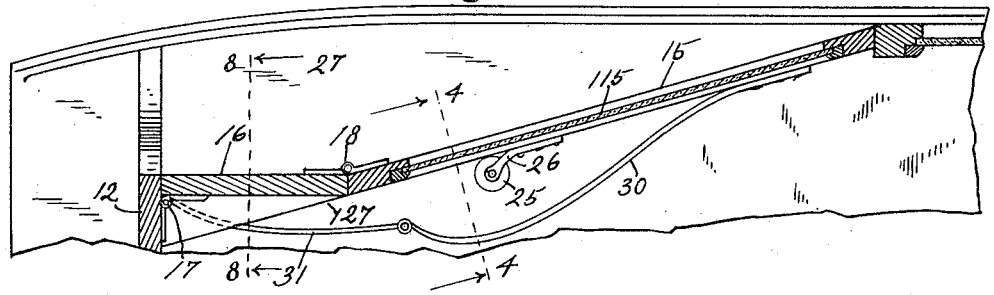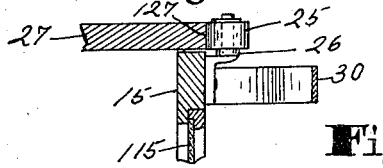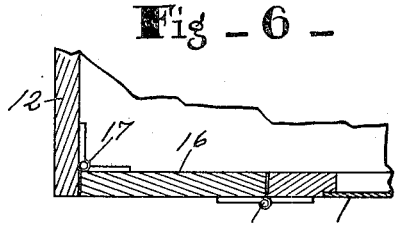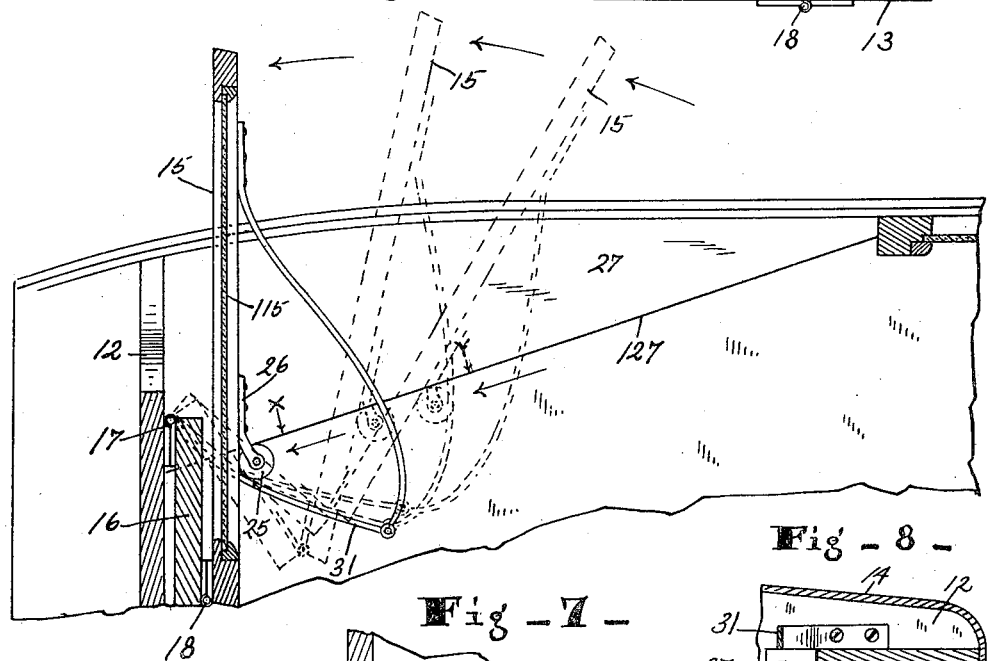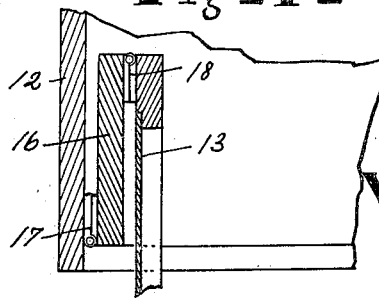

UNITED STATES PATENT OFFICE.

WILLIAM H. JORDAN, OF KNIGHTSTOWN, INDIANA, ASSIGNOR TO VEHICLE STORM & TOP CO., OF KNIGHTSTOWN, INDIANA, A COPARTNERSHIP.

VEHICLE-DOOR.

999,370.  Specification of Letters Patent.  Patented Aug. 1, 1911.

Application filed September 8, 1910. Serial No. 580,997.

*To all whom it may concern:*

Be it known that I, WILLIAM H. JORDAN, of Knightstown, county of Henry, and State of Indiana, have invented a certain useful Vehicle-Door; and I do hereby declare that the following is a full, clear, and exact description thereof, reference being had to the accompanying drawings.

The object of this invention is to provide a door of novel construction and operation for vehicles and the like, the door being arranged so that a portion will project inwardly and a portion outwardly of the door opening when the door is opened, and thus render the door opening of the vehicle more accessible. As compared with prior doors of the same general character, the object of this door construction is to enable the door to be opened and yet reduce the outward and inward extensions of the door as compared with prior doors.

The nature of the invention will be understood from the accompanying drawings and the following description and claims.

Figure 1:
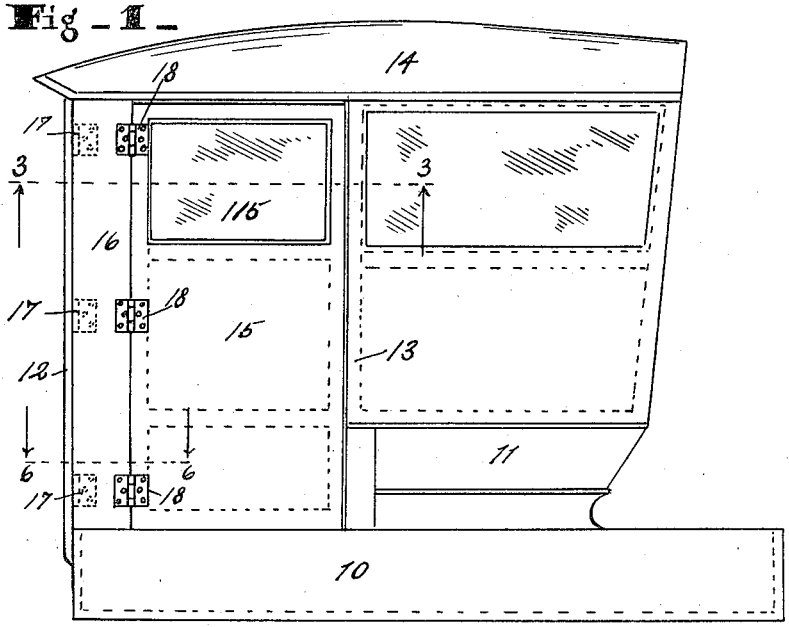
Figure 2:
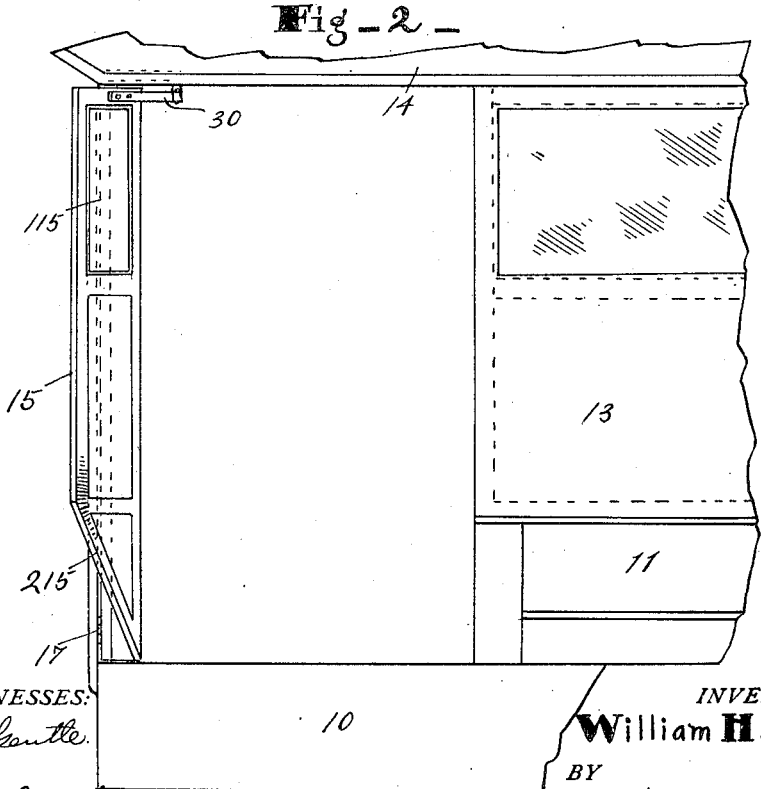

In the drawings Figure 1 is a side elevation of a vehicle body and top provided with said door. Fig. 2 is the same on a larger scale with parts broken away and showing the door open. Fig. 3 is a horizontal section on the line 3—3 of Fig. 1 through a portion of the vehicle top and through the door while closed. Fig. 4 is a vertical section on the line 4—4 of Fig. 3. Fig. 5 is a view similar to that of Fig. 3 showing the door open. Fig. 6 is a section on the line 6—6 of Fig. 1. Fig. 7 is the same as Fig. 6 with the door open. Fig. 8 is a section on the line 8—8 of Fig. 3.

There is shown herein a body 10 of a buggy, a seat 11 and a buggy top with a front portion 12, a side portion 13 and top 14.

The door consists of two sections or portions 15 and 16. The portion 16 is hinged to the part 12 by hinges 17 like any ordinary door. The part 15 is hinged to the free edge of the part 16 by hinges 18. The width of the part 16 may be such as desired, the chief consideration being the extent to which it is desired that the door shall project inwardly. The hinges 17 are on the inside of the door member 16 so that the door member 16 always folds inwardly, while the hinges 18 are on the outside of the associated door members so that the door member 15 opens outwardly, and when the two door members are opened, they are folded one against the other and both extend substantially transverse of the buggy, as shown in Figs. 5 and 7. The member 15 of the door has a glass portion 115 at its upper end and said member of the door has its lower end 215 inclined rearwardly and outwardly, as indicated in Fig. 2, to conform to the swell of the vehicle top. Hence the door makes a tight joint with all the associated parts.

To open the door, the member 15 is drawn outwardly. To cause the two members of the door to fold as said member 15 is opened outwardly, it is provided with a roller 25 on an arm 26 secured to it, said roller bearing against the inner edge 127 of a board 27 which is substantially horizontal and extends inwardly from the inner portion of the vehicle top 14 just over the door, as seen in Figs. 3 and 5, which are views looking upwardly upon the section lines 3—3 of Fig. 1. The roller 25, therefore, serves as a fulcrum and bears against the bearing surface 127. Hence when the member 15 is pulled outwardly, it tends to turn crosswise on its fulcrum 25, but as it does so, the fulcrum rolls forwardly along the surface 127, which causes the members 15 and 16 to fold together, as shown in Fig. 5, and against the front of the vehicle, and the door is completely opened.

The door is held open and closed by a pair of springs made of flat strips of metal, one spring 30 being secured to the member 15 of the door near its upper rear corner and at its free end hinged to the member 31, which is inclined upwardly and secured to the front portion 12 of the vehicle top above the board 27 at a point immediately above the upper hinge 17 of the member 16 of the door. The spring 30 tends to push inwardly from the member 15 of the door, while the other spring 31 tends to push outwardly toward the edge 127 of the board 27 and is secured to the spring 30, which is so located on the member 15 of the door that the combined operation of the two springs will tend to cause the door to spring shut as it approaches the closing movement and spring open as it approaches the opening movement, and during the opening and closing movements the roller 25 travels along the edge 127 of the board 27, and coöperates with the springs and edge 127 of the board 27 to regulate the movement of the door while opening and closing. During the intermediate stages of the movements of the door from the open to the closed position, or vice versa, the action of the springs is neutralized by the roller and its engaging surface 127, so that the door will stand in any position to which it is moved, excepting when approaching its opening and closing position. This middle position is indicated by dotted lines in Fig. 5. While opening, the door must be forced until the roller reaches a point at substantially the point X on the surface 127, when the action of the roller on said surface ceases to oppose the action of the springs 30 and 31 and permits them to throw the door forwardly in the open position, as shown in Fig. 5. During the closing movement the door must be forced until the roller reaches about the point Y on the surface 127, when again the roller ceases to oppose the inward push of the springs 30 and 31 and said springs then force the door shut.

I claim as my invention:

1. A frame having a door opening, a door for said opening formed of two vertical sections or members, hinges for hinging them together and also hinges for hinging one member to the frame whereby one member is doubly hinged or has a double set of hinges secured to it and the other member is singly hinged or has but one set of hinges secured to it and the two sets of hinges are on opposite sides of the door so that the members of the door will fold as the door opens, means on the singly hinged member of the door and coöperating with the frame for guiding the door in its opening and closing movements, and a spring construction connected with the frame and said singly hinged member of the door for forcing the door to the open and closed positions.

2. A frame having a door opening, a door for said opening formed of two vertical sections or members, hinges for hinging them together so as to fold on each other and also hinges for hinging one member to the frame whereby one member is doubly hinged or has a double set of hinges secured to it and the other member is singly hinged or has but one set of hinges secured to it and the two sets of hinges are on opposite sides of the door so that the members of the door will fold as the door opens, a roller secured to the singly hinged member of the door and extending upwardly therefrom, a horizontally extending guide plate secured to the frame and having a vertical surface outside said roller and against which it bears, a spring arm secured to the frame and projecting beyond the double hinged member of the door when closed, and a spring arm pivoted to the free end of said first-mentioned arm and secured to the singly hinged member of the door near its free end, substantially as set forth.

In witness whereof, I have hereunto affixed my signature in the presence of the witnesses herein named.

WILLIAM H. JORDAN.

Witnesses:
 PETER WAGNER,
 C. S. WALLACE.

---

Copies of this patent may be obtained for five cents each, by addressing the "Commissioner of Patents, Washington, D. C."